(12) United States Patent
Chalenko

(10) Patent No.: US 9,195,120 B2
(45) Date of Patent: Nov. 24, 2015

(54) UNIVERSAL ADJUSTABLE LENS ADAPTER

(71) Applicant: Vadym Chalenko, De Plaines, IL (US)

(72) Inventor: Vadym Chalenko, De Plaines, IL (US)

( * ) Notice: Subject to any disclaimer, the term of this patent is extended or adjusted under 35 U.S.C. 154(b) by 0 days.

(21) Appl. No.: 14/332,077

(22) Filed: Jul. 15, 2014

(65) Prior Publication Data

US 2015/0029604 A1     Jan. 29, 2015

Related U.S. Application Data

(60) Provisional application No. 61/858,034, filed on Jul. 24, 2013.

(51) Int. Cl.
    *G02B 7/02*     (2006.01)
    *G03B 21/14*     (2006.01)
    *G03B 17/56*     (2006.01)
    *H04N 5/225*     (2006.01)
    *G03B 5/02*     (2006.01)
    *G03B 5/04*     (2006.01)

(52) U.S. Cl.
CPC .............. *G03B 17/566* (2013.01); *G02B 7/023* (2013.01); *G03B 17/563* (2013.01); *H04N 5/2257* (2013.01); *G03B 5/02* (2013.01); *G03B 5/04* (2013.01); *G03B 17/568* (2013.01)

(58) Field of Classification Search
CPC ............ G03B 5/02; G03B 5/04; G03B 17/48; G03B 17/56; G03B 17/563; G03B 17/566; G03B 17/568; G03B 21/14; G03B 21/142; G03B 21/145; G02B 7/02; G02B 7/00; G02B 7/023
USPC .......... 359/811, 813, 818, 819, 822; 396/387, 396/395, 446; 248/476; 353/100, 101; 355/55, 63
See application file for complete search history.

(56) References Cited

U.S. PATENT DOCUMENTS

| | | | |
|---|---|---|---|
| 4,757,374 A * | 7/1988 | Ramsay et al. | 355/40 |
| 7,357,518 B2 * | 4/2008 | Iinuma | 353/101 |
| 8,189,279 B2 * | 5/2012 | Chen | 359/822 |

* cited by examiner

*Primary Examiner* — Loha Ben

(57) ABSTRACT

A universal adjustable lens adapter and rig system for smartphones, or similar electronic devices, that is modular in nature. The universal adjustable lens adapter includes a clamp mount assembly, a lens mount assembly, and a handle assembly. The clamp mount assembly provides a means for securing a smartphone, while the lens mount assembly provides a means for securing a camera lens. The clamp mount assembly includes a spring loaded first clamp and a fixed second clamp mounted to a clamp base and between which the smartphone is secured. Both the clamp mount assembly and the lens mount assembly are slidably connected to the handle assembly, such that the camera lens of any smartphone can be properly aligned with the camera lens attached to the lens mount assembly. Additionally, the handle assembly provides a means for manipulating and stabilizing the smartphone while taking pictures.

20 Claims, 14 Drawing Sheets

UNIVERSAL ADJUSTABLE LENS ADAPTER

The current application claims a priority to the U.S. Provisional Patent application Ser. No. 61/858,034 filed on Jul. 24, 2013.

FIELD OF THE INVENTION

The present invention relates generally to smartphone accessories. More specifically, the present invention is a universal adjustable lens adapter and rig system for smartphones. The present invention is modular and allows a user to mount a variety of accessories to a smartphone.

BACKGROUND OF THE INVENTION

The advancement of mobile electronic technology has led to a surge in the popularity of smartphones. Smartphones are favored for their high level of versatility and functionality. Modern smartphones allow users to place calls, send text messages, play games, and access the Internet. Another common use for smartphones is to capture and share media such as photos and videos. Smartphones typically feature one or more cameras that are capable of capturing both still images and videos. However, the majority of smartphones feature a rectangular design, and are relatively thin. This can create difficulties when attempting to hold a smartphone steady during image and video capture. Additionally, despite the advanced capabilities, much of the camera technology of smartphones is limited with regards to the ability to utilize the cameras in conjunction with existing lens and camera accessories. As a result, there is generally no way to improve and enhance captured media through add-on lenses such as macro lenses, fisheye lenses, and wide angle lenses, as well as accessories such as tripods, stabilizers, microphones, and flash units. The present invention seeks to address the aforementioned issues relating to smartphone-integrated camera technology as well as accessories that are commonly used in multimedia capture.

The present invention is a universal adjustable lens adapter and rig system that is adaptable as to accommodate all smartphones. In the preferred embodiment, the present invention comprises a lens mount assembly, a handle assembly, and a clamp mount assembly. The clamp mount assembly is adjustable and spring loaded to secure a smartphone in place within the universal adjustable lens adapter and rig system. The clamp mount assembly includes a cold shoe mount that allows a user to mount accessories, such as flash units, to the universal adjustable lens adapter and rig system. The lens mount assembly features a standardized threaded lens mount ring for accommodating add-on lenses. The lens mount assembly is adjustable to align the smartphone camera with the lens mount ring. The handle assembly features a first handle and a second handle that allow a user to hold the universal adjustable lens adapter and rig system with two hands for a high degree of stability. In addition to the previously mentioned accessory mounting points, the universal adjustable lens adapter and rig system features a plurality of additional standardized threaded mount inserts that accommodate accessories such as tripods and other mounting accessories. Furthermore, the components of the present invention are designed in a manner such that the universal adjustable lens adapter and rig system may rest on a flat surface in both a horizontal and vertical orientation. The components of the lens adapter and rig system are lightweight in order to facilitate ease of use and user comfort.

The object of the present invention is to provide a means to utilize multiple existing lens and camera accessories with a smartphone or tablet. It is a further object of the present invention to be modular and universally adaptable to all smartphone or tablet devices and camera accessories.

DETAIL DESCRIPTIONS OF THE INVENTION

All illustrations of the drawings are for the purpose of describing selected versions of the present invention and are not intended to limit the scope of the present invention.

The present invention is a universal adjustable lens adapter and rig system for smartphones, or similar electronic devices such as tablets, that is modular in nature. The present invention allows a user to utilize existing lens and camera accessories in conjunction with a smartphone device. In reference to FIG. 1, the present invention comprises a lens mount assembly 10, a clamp mount assembly 20, and a handle assembly 60. The lens mount assembly 10 provides a means for securing and aligning a camera lens, while the clamp mount assembly 20 provides a means for securing and aligning the smartphone. The handle assembly 60 supports both the lens mount assembly 10 and the clamp mount assembly 20.

Figure 1:
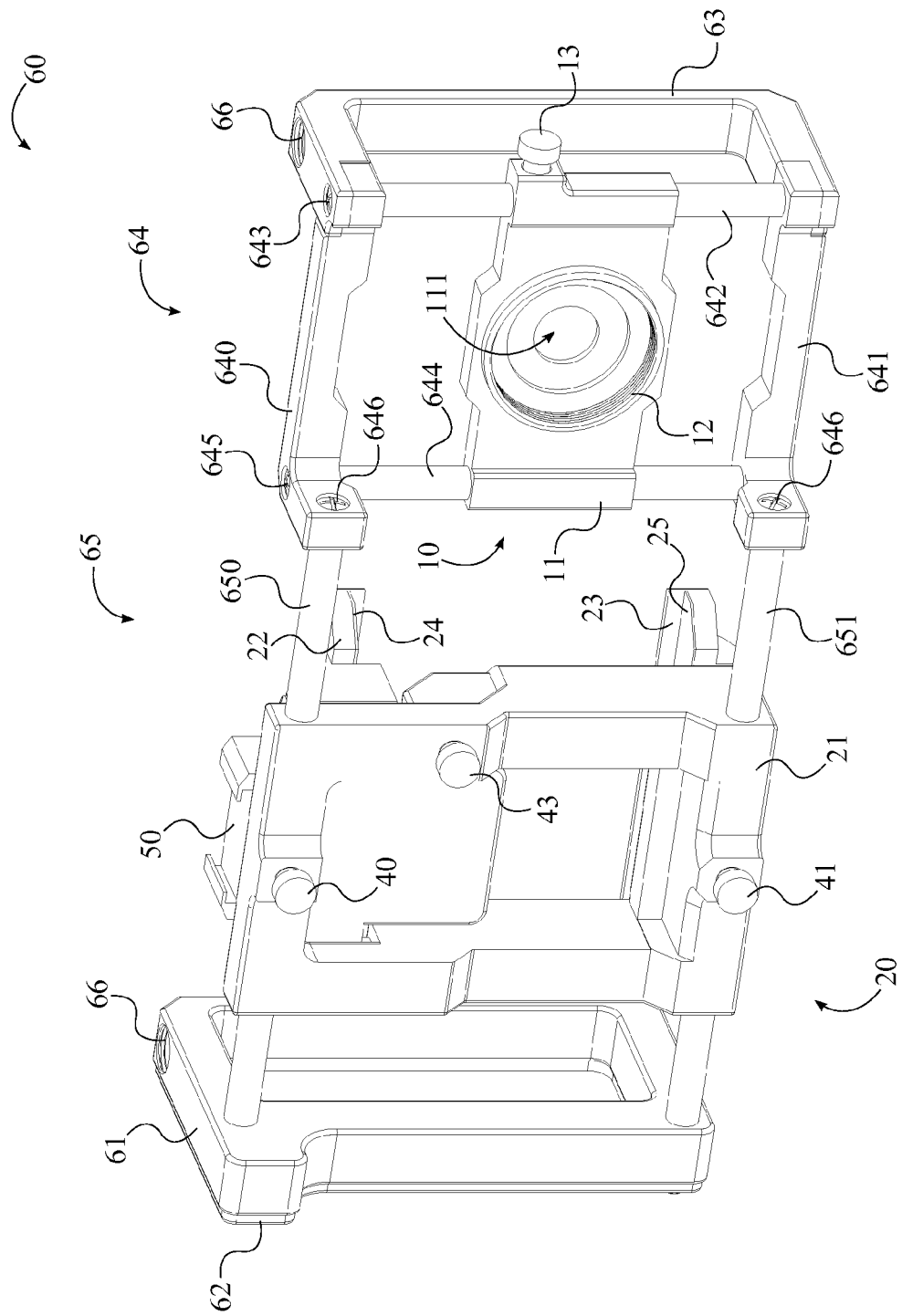
FIG. 1 is a perspective view of the present invention.

In further reference to FIG. 1, the handle assembly 60 comprises a clamp mount support 65, a lens mount support 64, a first handle 61, and a second handle 63. The clamp mount support 65 is adjacently connected to the lens mount support 64, while the first handle 61 is adjacently attached to the clamp mount support 65 opposite the lens mount support 64 and the second handle 63 is adjacently attached to the lens mount support 64 opposite the clamp mount support 65. Together, the clamp mount support 65, the lens mount support 64, the first handle 61, and the second handle 63 form a frame to support the lens mount assembly 10 and the clamp mount assembly 20. The first handle 61 and the second handle 63 provide a means for the user to readily grasp and maneuver the present invention when a smartphone is positioned within the clamp mount assembly 20 in order to take pictures.

Figure 2:
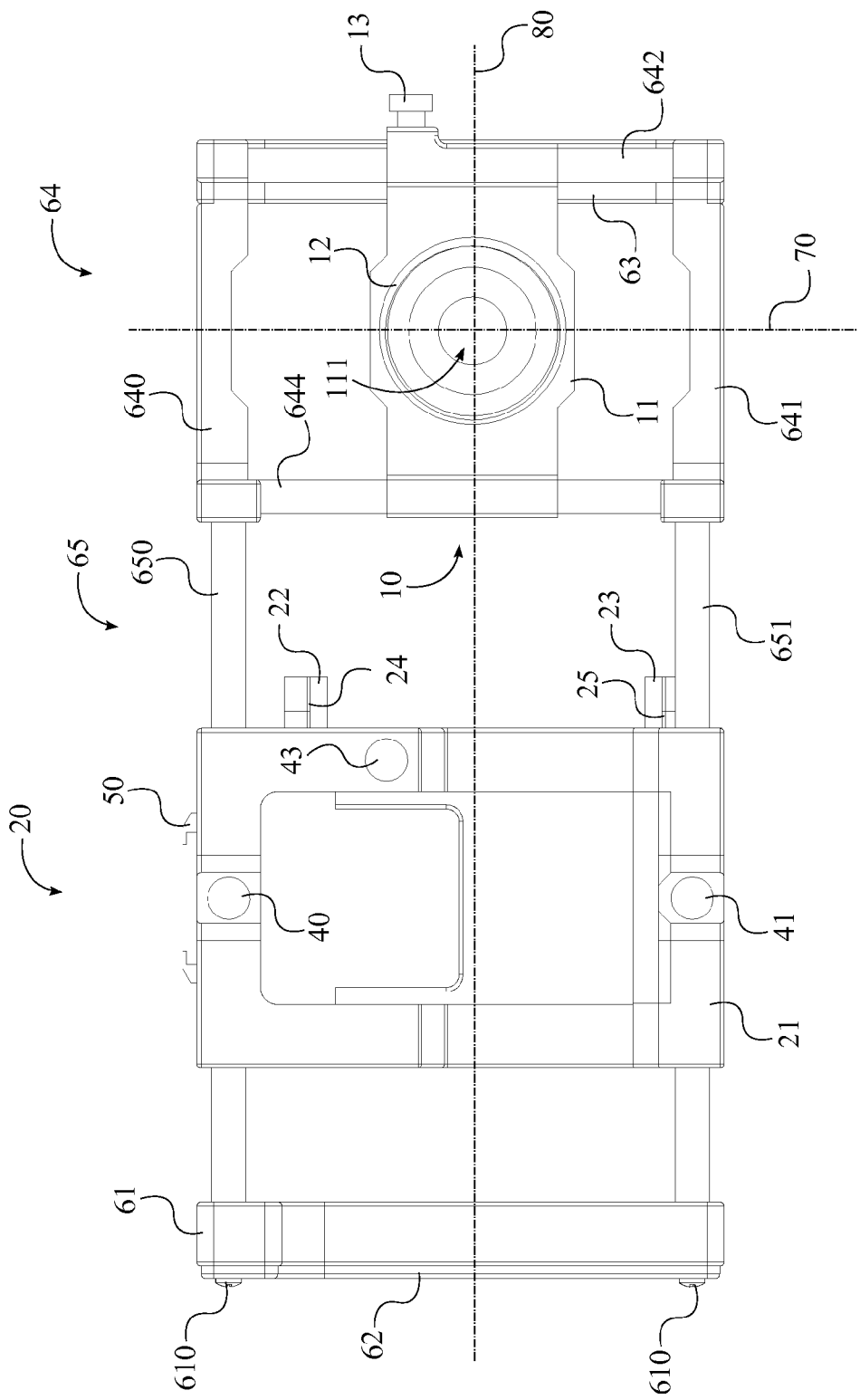
FIG. 2 is a front elevational view of the present invention.
Figure 3:
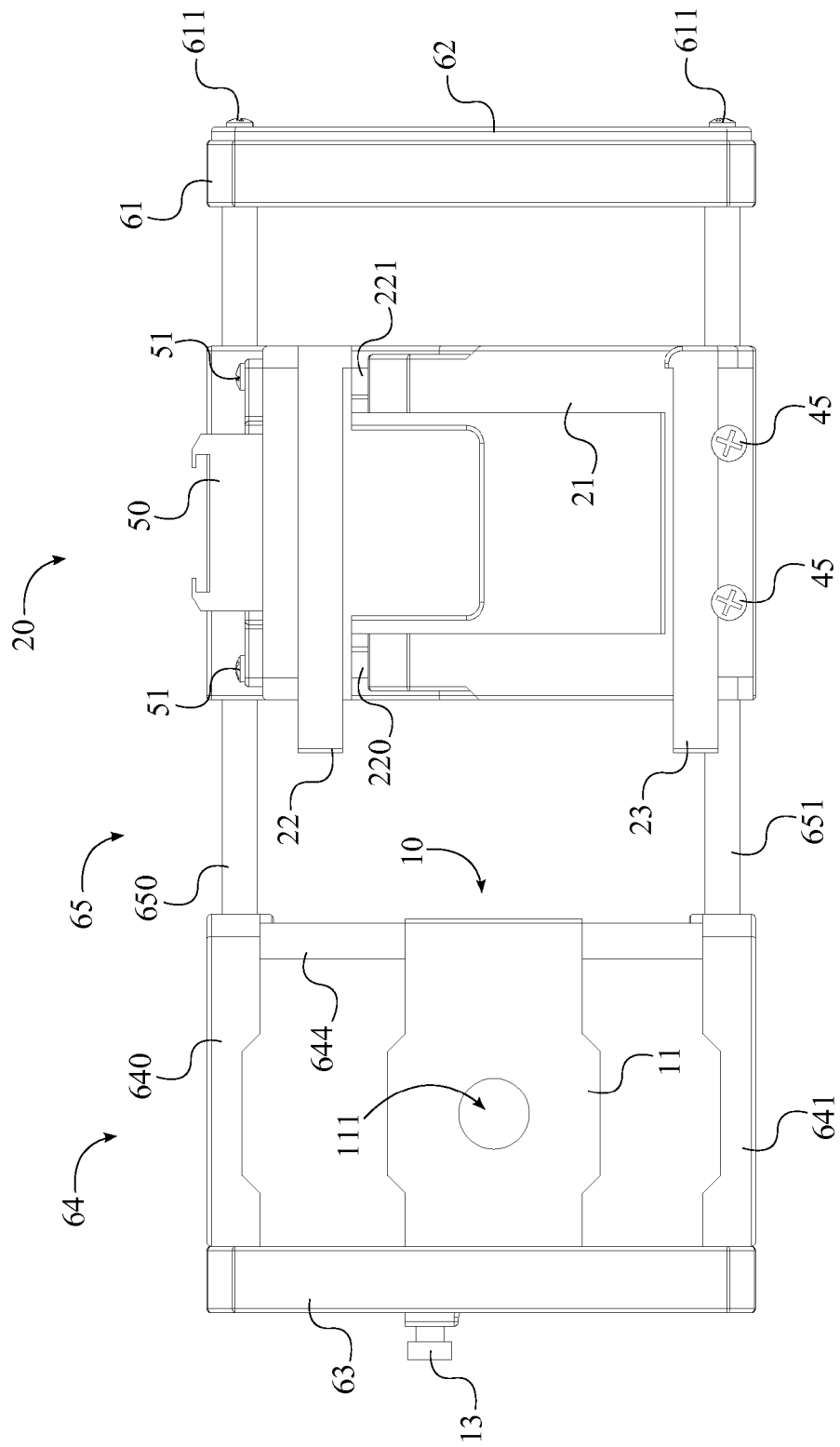
FIG. 3 is a rear elevational view of the present invention.

In reference to FIG. 2-3, the lens mount support 64 comprises a first lens mount standoff shaft 642, a second lens mount standoff shaft 644, a first arm 640, and a second arm 641. The first arm 640 and the second arm 641 are adjacently attached to the second handle 63, wherein the first arm 640 and the second arm 641 are positioned opposite each other along the second handle 63. The first lens mount standoff shaft 642 and the second lens mount standoff shaft 644 are adjacently connected to the first arm 640 and the second arm 641; the first lens mount standoff shaft 642 and the second lens mount standoff shaft 644 being positioned in between the first arm 640 and the second arm 641. The first lens mount standoff shaft 642 is positioned adjacent to the second handle 63, while the second lens mount standoff shaft 644 is positioned adjacent to the clamp mount support 65.

Figure 15:
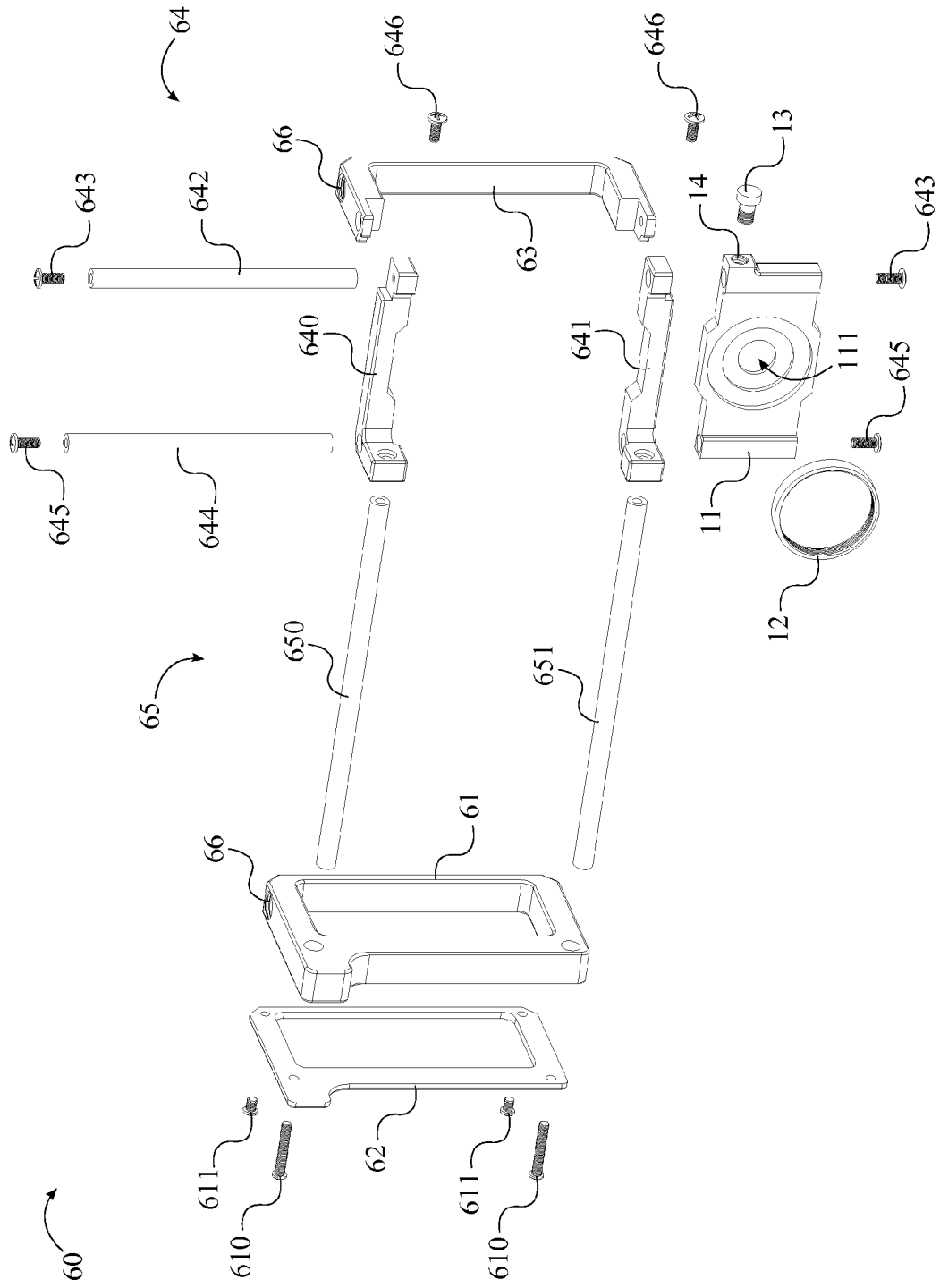
FIG. 15 is a an exploded view of the handle assembly and the lens mount assembly.

In reference to FIG. 1 and FIG. 15, in the preferred embodiment of the present invention, the first lens mount standoff shaft 642 is connected to the first arm 640 and the second arm 641 by a first pair of lens mount screws 643 and the second lens mount standoff is connected to the first arm 640 and the second arm 641 by a second pair of lens mount screws 645. Each of the first pair of lens mount screws 643 traverses through the second handle 63 and either the first arm 640 or the second arm 641 and then into opposite ends of the first lens mount standoff shaft 642. Each of the second pair of lens mount screws 645 traverses through either the first arm 640 or the second arm 641 and into opposite ends of the second lens mount standoff shaft 644.

In reference to FIG. 2, the lens mount assembly 10 comprises a lens mount base 11, a lens mount ring 12, and a lens mount thumb screw 13. The lens mount base 11 is slidably connected to the lens mount support 64 along a first slide axis 70. More specifically, the lens mount base 11 is slidably connected to the first lens mount standoff shaft 642 and the second lens mount standoff shaft 644, wherein the first lens mount standoff shaft 642 and the second lens mount standoff shaft 644 traverse through the lens mount base 11. The lens mount thumb screw 13 is positioned into the lens mount base 11 and is positioned adjacent to either the first lens mount standoff shaft 642 or the second lens mount standoff shaft 644. In this way, the lens mount thumb screw 13 can be made to engage either the first lens mount standoff shaft 642 or the second lens mount standoff shaft 644, such that the lens mount base 11 is locked in place along the first lens mount standoff shaft 642 and the second lens mount standoff shaft 644.

In reference to FIG. 1 and FIG. 15, in the preferred embodiment of the present invention, a threaded lens mount insert 14 is positioned through the lens mount base 11 adjacent to either the first lens mount standoff shaft 642 or the second lens mount standoff shaft 644. The lens mount thumb screw 13 is then threaded into the threaded lens mount insert 14, wherein the lens mount thumb screw 13 can be made to engage either the first lens mount standoff shaft 642 or the second lens mount standoff shaft 644. The threaded lens mount insert 14 reinforces the section of the lens mount base 11 into which the lens mount thumb screw 13 traverses and is ideally constructed from metal, however, any other material may also be used.

Figure 10:
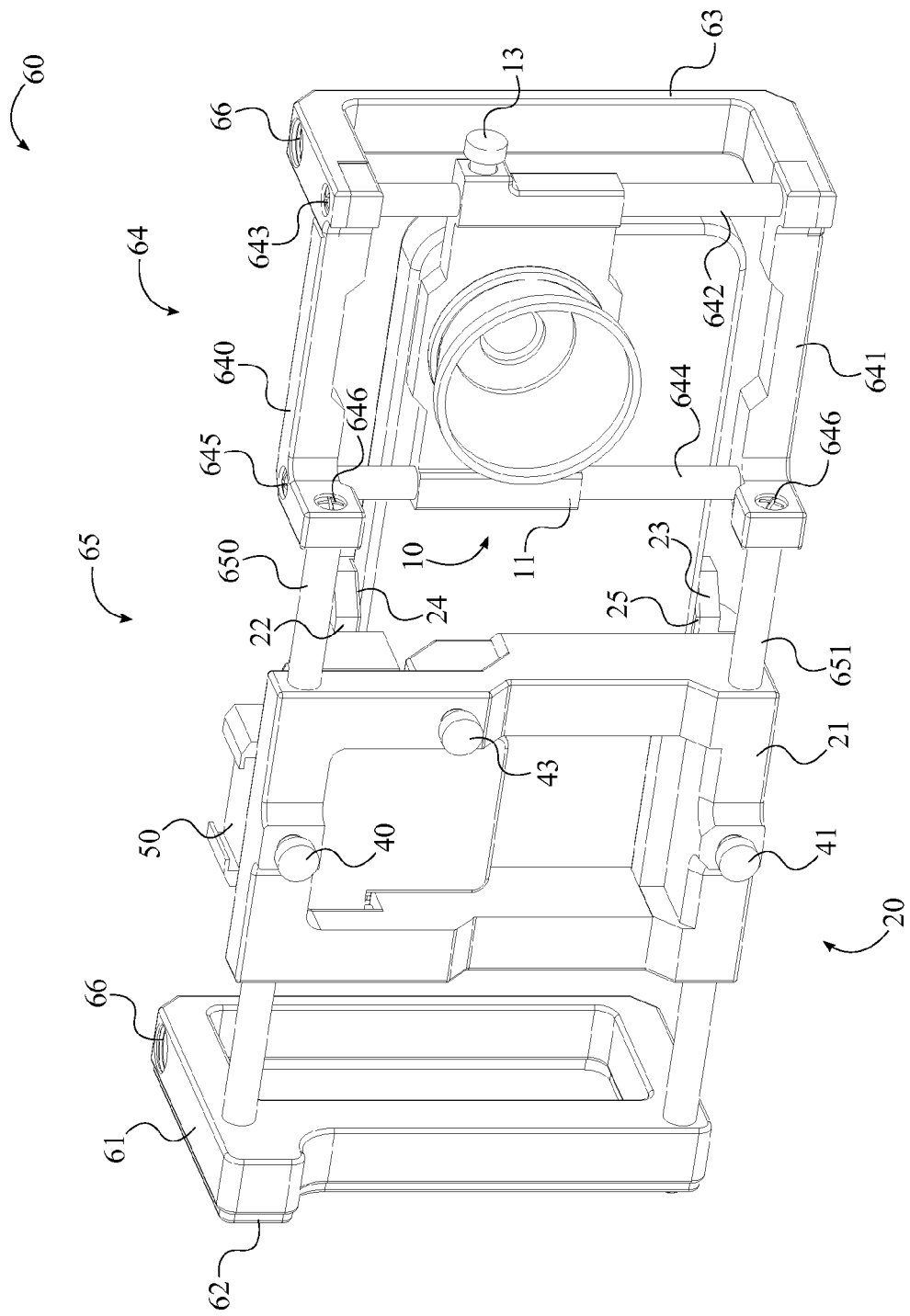
FIG. 10 is a perspective view thereof.

The lens mount ring 12 is adjacently connected to the lens mount base 11 and provides a means for securing a camera lens to the lens mount assembly 10. In the preferred embodiment of the present invention, the lens mount ring 12 has internal threading in order to secure the desired camera lens in place, however, it is possible for the lens mount ring 12 to provide other means of attachment, such as a snap fit. The lens mount ring 12 is positioned around an aperture 111 in the lens mount base 11, wherein the aperture 111 is aligned with the camera lens of the smartphone, as shown in FIG. 10, by positioning the lens mount base 11 along the first lens mount standoff shaft 642 and the second lens mount standoff shaft 644. In this way, the desired camera lens or additional attachment is aligned with the camera lens of the smartphone.

In reference to FIG. 1, the clamp mount support 65 comprises a first handle standoff shaft 650 and a second handle standoff shaft 651. The first handle standoff shaft 650 and the second handle 63 shaft are adjacently attached to the first handle 61, wherein the first handle standoff shaft 650 and the second handle standoff shaft 651 are positioned opposite each other along the first handle 61. The first arm 640 is adjacently connected to the first handle standoff shaft 650 opposite the first handle 61, and the second arm 641 is adjacently connected to the second handle standoff shaft 651 opposite the first handle 61. The handle assembly 60 further comprises a handle skin 62 that is attached to the first handle 61 opposite the first handle standoff shaft 650 and the second handle standoff shaft 651. The handle skin 62 provides a unique, decorative face plate for the first handle 61 that can be customized for each user.

In reference to FIG. 1 and FIG. 15, in the preferred embodiment of the present invention, the first arm 640 and the second arm 641 are connected to the first handle standoff shaft 650 and the second handle standoff shaft 651 respectively, by a third pair of lens mount screws 646. Each of the third pair of lens mount screws 646 traverses either through the first arm 640 and into the first handle standoff shaft 650 or traverses through the second arm 641 and into the second handle standoff shaft 651. Additionally, in the preferred embodiment of the present invention, the first handle standoff shaft 650 and the second handle standoff shaft 651 are attached to the first handle 61 by a first pair of handle screws 610. Each of the first pair of handle screws 610 traverses through the handle skin 62, through the first handle 61, and into either the first handle standoff shaft 650 or the second handle standoff shaft 651. Additionally, a second pair of handle screws 611, adjacent to the first pair of handle screws 610, traverses through the handle skin 62 into the first handle 61 in order to further secure the handle skin 62.

Figure 14:
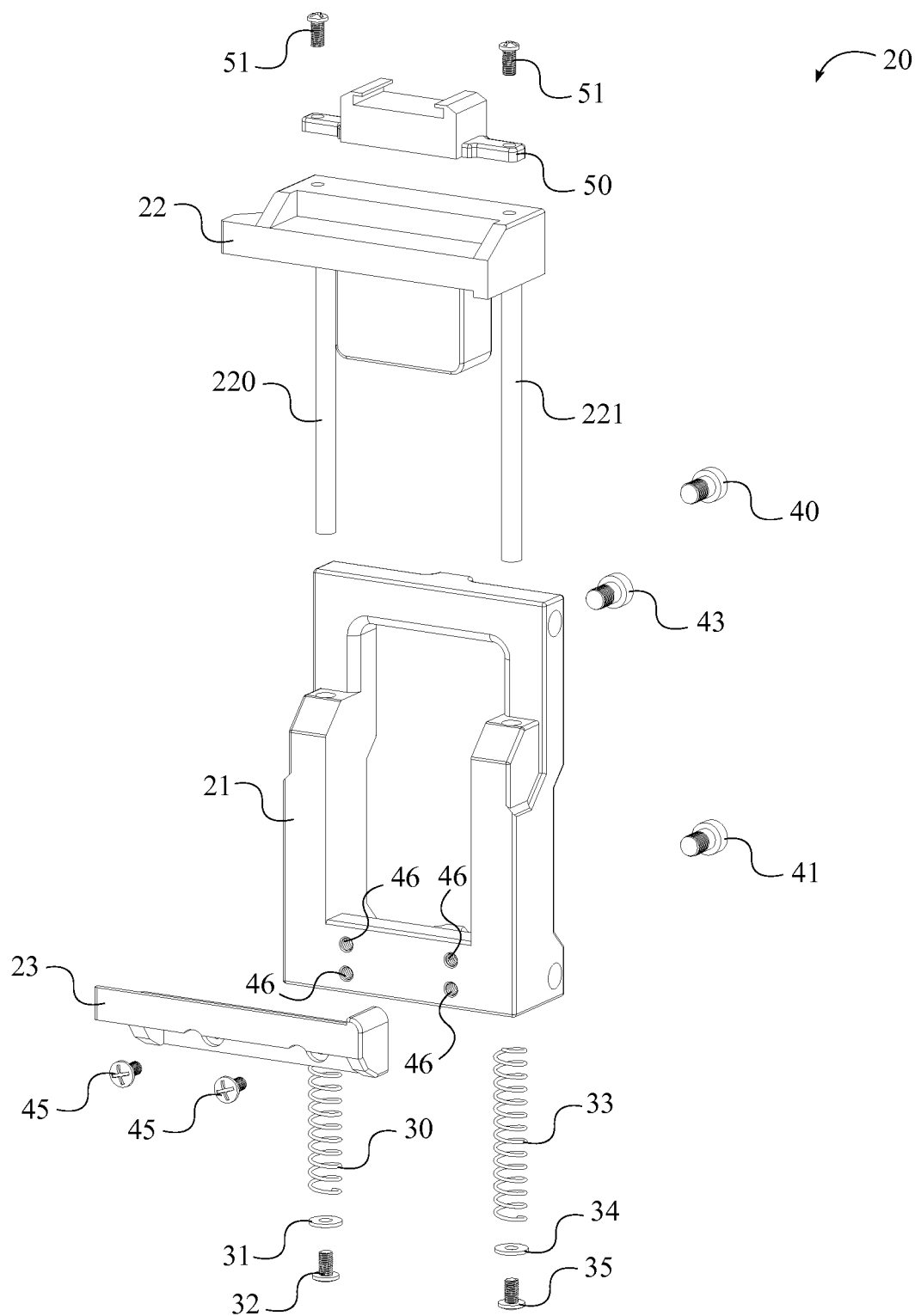
FIG. 14 is an exploded view of the clamp mount assembly.

In reference to FIG. 14, the clamp mount assembly 20 comprises a clamp base 21, a first clamp 22, a second clamp 23, a first clamp grip 24, a second clamp grip 25, a first compression spring 30, a second compression spring 33, a first thumb screw 40, a second thumb screw 41, and a clamp mount thumb screw 43. In reference to FIG. 2, the clamp base 21 is slidably attached to the clamp mount support 65 along a second slide axis 80. More specifically, the clamp base 21 is slidably attached to the first handle standoff shaft 650 and the second handle standoff shaft 651, wherein the first handle standoff shaft 650 and the second handle standoff shaft 651 traverse through the clamp base 21. The second slide axis 80 is aligned perpendicular to the first slide axis 70, such that the clamp mount assembly 20 may slide horizontally and the lens mount assembly 10 may slide vertically when the present invention is positioned as shown in FIG. 2.

In reference to FIG. 1, the first thumb screw 40 and the second thumb screw 41 are positioned into the clamp base 21. The first thumb screw 40 is positioned adjacent to the first handle standoff shaft 650 and the second thumb screw 41 is positioned adjacent to the second handle standoff shaft 651.

In this way, the first thumb screw 40 and the second thumb screw 41 can be made to engage the first handle standoff shaft 650 and the second handle standoff shaft 651 respectively, such that the clamp base 21 is locked in place along the first handle standoff shaft 650 and the second handle standoff shaft 651.

Figure 13:
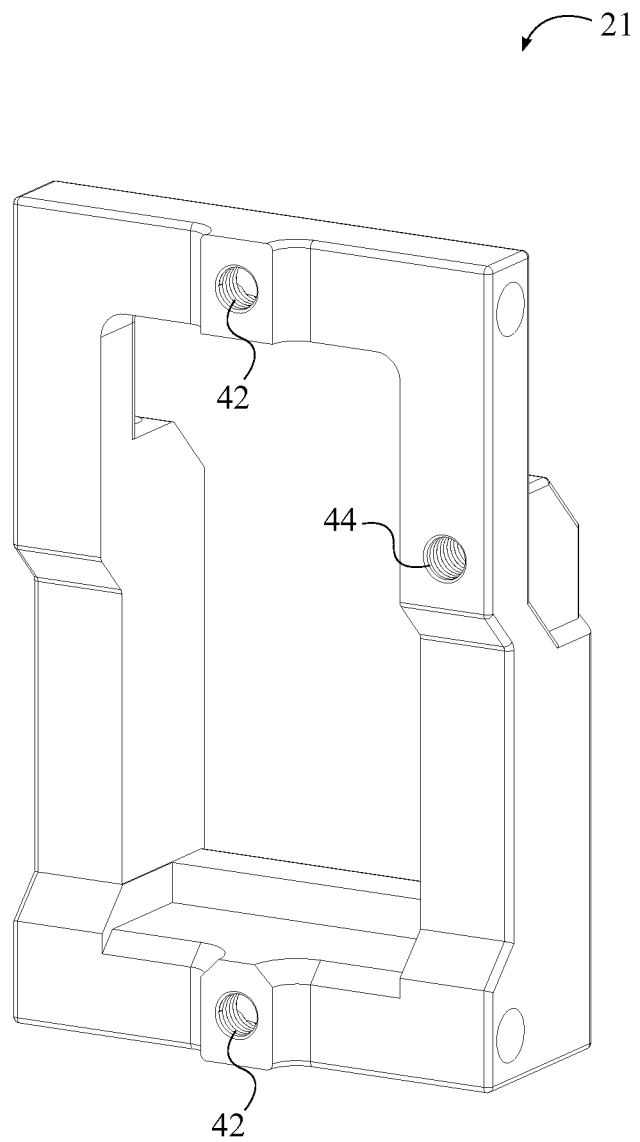
FIG. 13 is a perspective view of the clamp base, wherein the first thumb screw, second thumb screw, and the clamp mount thumb screw are removed.

In reference to FIG. 13, in the preferred embodiment of the present invention, a pair of threaded inserts 42 is positioned into the clamp base 21 adjacent to the first handle standoff shaft 650 and the second handle standoff shaft 651. The first thumb screw 40 and the second thumb screw 41 are then threaded into the pair of threaded inserts 42, wherein the first thumb screw 40 and the second thumb screw 41 can be made to engage the first handle standoff shaft 650 and the second handle standoff shaft 651 respectively. The pair of threaded inserts 42 reinforces the section of the clamp base 21 into which the first thumb screw 40 and the second thumb screw 41 traverse and, ideally, each of the pair of threaded inserts 42 is constructed from metal; however, any other material may also be used.

Figure 8:
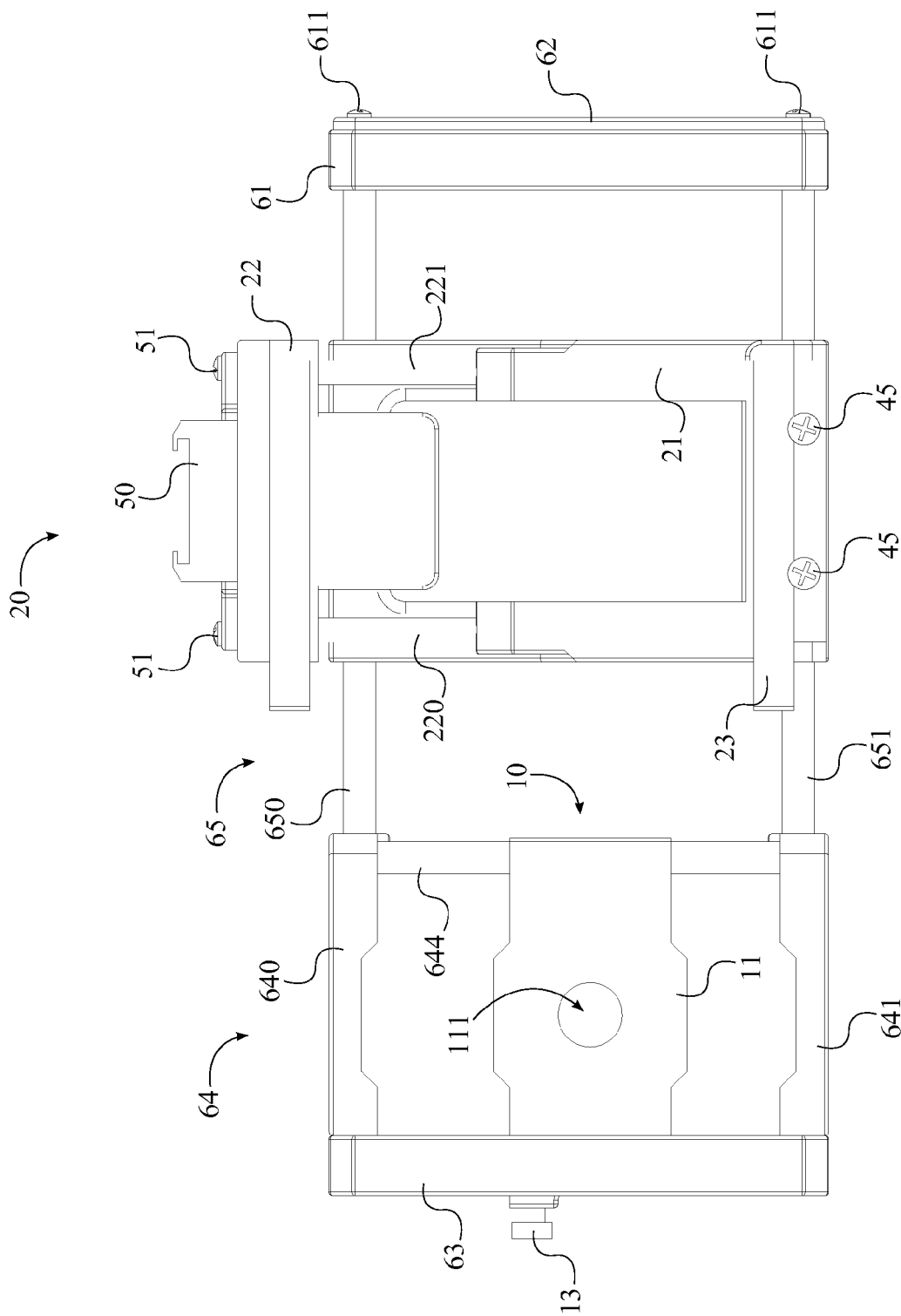
FIG. 8 is a rear elevational view of the present invention, wherein the clamp mount assembly is opened in order to receive an electronic device.

In reference to FIG. 3 and FIG. 8, the first clamp 22 is slidably connected to the clamp base 21 and comprises a first clamp mount standoff shaft 220 and a second clamp mount standoff shaft 221. The first clamp mount standoff shaft 220 and the second clamp mount standoff shaft 221 are positioned opposite each other along the first clamp 22. The first clamp mount standoff shaft 220 and the second clamp mount standoff shaft 221 are slidably connected to the clamp base 21, wherein the first clamp mount standoff shaft 220 and the second clamp mount standoff shaft 221 are positioned into the clamp base 21. The first compression spring 30 and the second compression spring 33 are positioned within the clamp base 21. The first compression spring 30 is positioned adjacent to the first clamp mount standoff shaft 220 and the second compression spring 33 is positioned adjacent to the second clamp mount standoff shaft 221.

Figure 11:
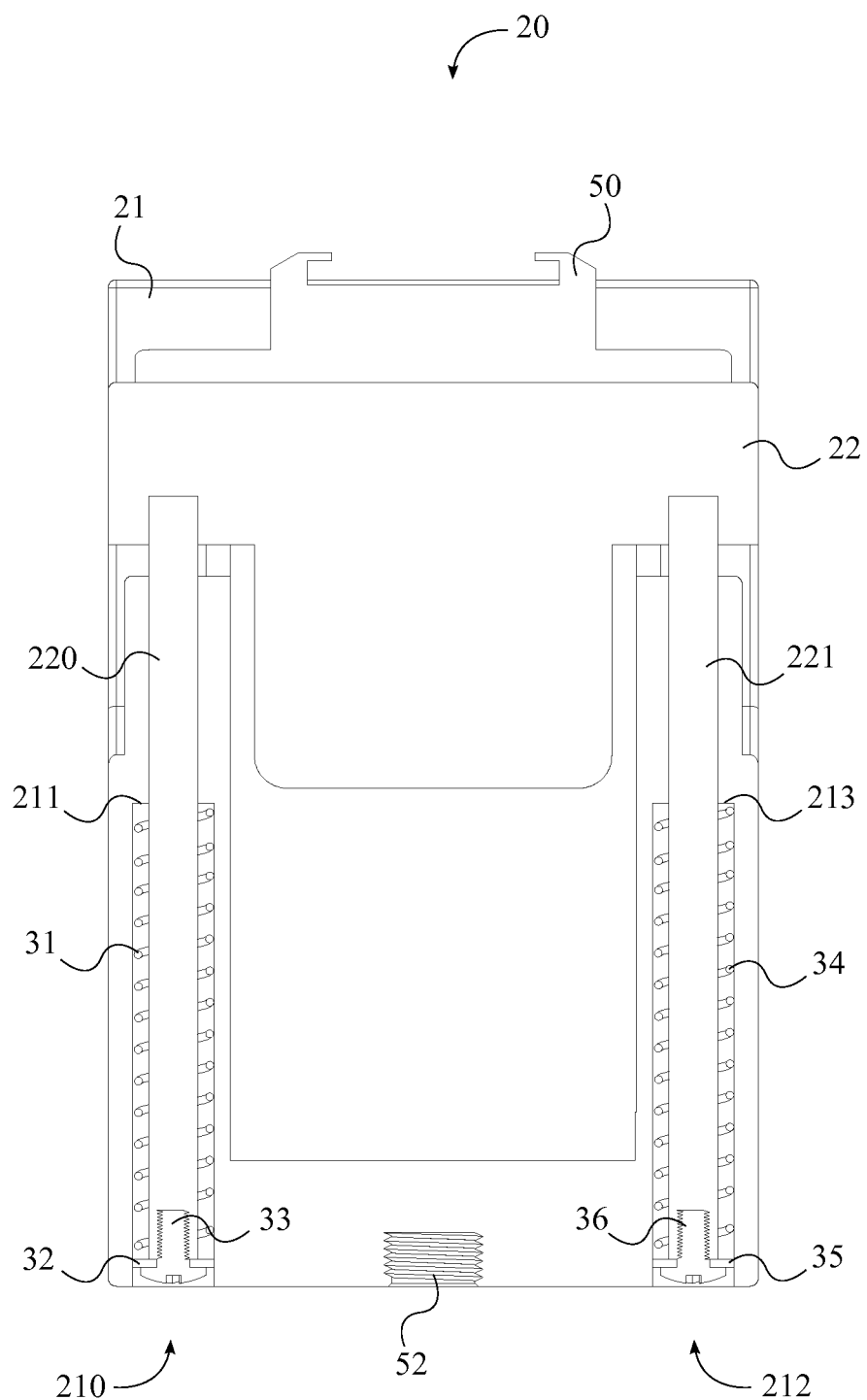
FIG. 11 is a rear sectional view of the clamp mount assembly, wherein the first compression spring and the second compression spring are decompressed.
Figure 12:
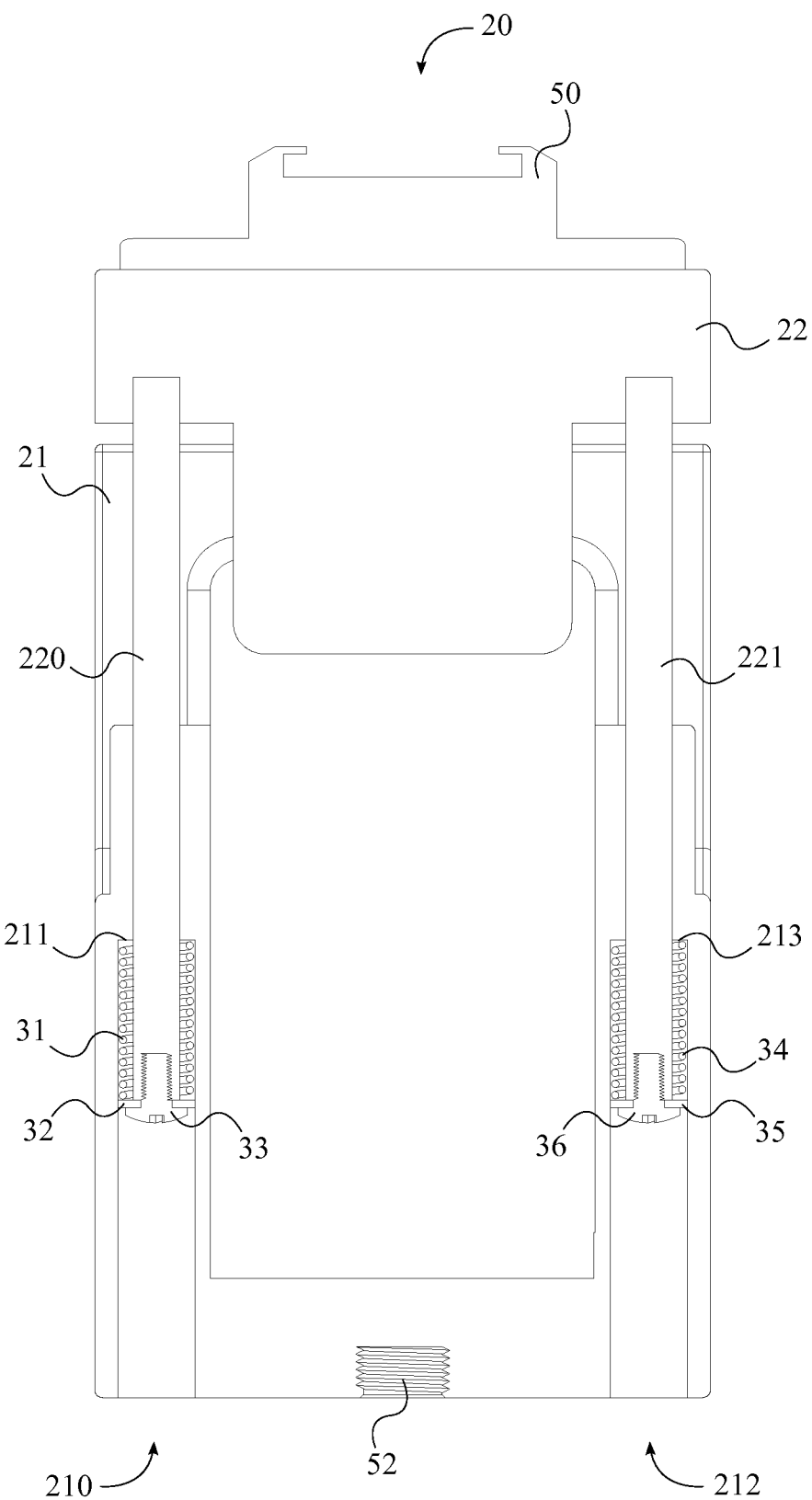
FIG. 12 is a rear sectional view of the clamp mount assembly, wherein the clamp mount assembly is open and both the first compression spring and the second compression spring are compressed.

In reference to FIG. 11-12, the first clamp mount standoff shaft 220 is mechanically coupled to the first compression spring 30 through a first washer 31 and a first screw 32. The first compression spring 30 is positioned into a first cavity 210 of the clamp base 21, wherein the first compression spring 30 rests on a first ledge 211. The first clamp mount standoff shaft 220 traverses through the first compression spring 30 and the first washer 31 is connected to the first clamp mount standoff shaft 220 by the first screw 32. The first washer 31 is positioned about the end of the first clamp mount standoff shaft 220, such that the first compression spring 30 is positioned in between the first washer 31 and the first ledge 211. In this way, when the first clamp 22 is pulled away from the second clamp 23, the first compression spring 30 is compressed, wherein when the first clamp 22 is released the spring force of the first compression spring 30 acts to restore the original position of the first clamp 22.

In further reference to FIG. 11-12, the second clamp mount standoff shaft 221 is mechanically coupled to the second compression spring 33 through a second washer 34 and a second screw 35. The second compression spring 33 is positioned into a second cavity 212 of the clamp base 21, wherein the second compression spring 33 rests on a second ledge 213. The second clamp mount standoff shaft 221 traverses through the second compression spring 33 and the second washer 34 is connected to the second clamp mount standoff shaft 221 by the second screw 35. The second washer 34 is positioned about the end of the second clamp mount standoff shaft 221, such that the second compression spring 33 is positioned in between the second washer 34 and the second ledge 213. In this way, when the first clamp 22 is pulled away from the second clamp 23, the second compression spring 33 is compressed, wherein when the first clamp 22 is released the spring force of the second compression spring 33 acts to restore the original position of the first clamp 22.

In reference to FIG. 1, the clamp mount thumb screw 43 is positioned into the clamp base 21 and is positioned adjacent to either the first clamp mount standoff shaft 220 or the second clamp mount standoff shaft 221. In this way, the clamp mount thumb screw 43 can be made to engage either the first clamp mount standoff shaft 220 or the second clamp mount standoff shaft 221, such that the first clamp 22 is locked in place about the clamp base 21. While the first compression spring 30 and the second compression spring 33 act to provide a clamping force between the first clamp 22 and he second clamp 23, the clamp mount thumb screw 43 ensures that the first clamp 22 cannot be inadvertently pulled away from the second clamp 23.

In reference to FIG. 13, in the preferred embodiment of the present invention, a threaded clamp mount insert 44 is positioned into the clamp base 21 adjacent to either the first clamp mount standoff shaft 220 or the second clamp mount standoff shaft 221. The clamp mount thumb screw 43 is then threaded into the threaded clamp mount insert 44, wherein the clamp mount thumb screw 43 can be made to engage either the first clamp mount standoff shaft 220 or the second clamp mount standoff shaft 221. The threaded clamp mount insert 44 reinforces the section of the clamp base 21 into which the clamp mount thumb screw 43 traverses and is ideally constructed from metal, however, any other material may also be used.

In reference to FIG. 3, the second clamp 23 is adjacently attached to the clamp base 21, wherein the first clamp 22 and the second clamp 23 are positioned opposite each other along the clamp base 21. In the preferred embodiment of the present invention, a plurality of threaded inserts 46 are positioned into the clamp base 21, as shown in FIG. 14, wherein the second clamp 23 is attached to the clamp base 21 through a pair of clamp screws 45. The pair of clamp screws 45 is positioned through the second clamp 23 and into the plurality of threaded inserts 46. In this way, the position of the second clamp 23 along the clamp base 21 can be adjusted. The plurality of threaded inserts 46 reinforces the section of the clamp base 21 into which the pair of clamp screws 45 traverses and, ideally, each of the plurality of threaded inserts 46 is constructed from metal; however, any other material may also be used.

Figure 5:
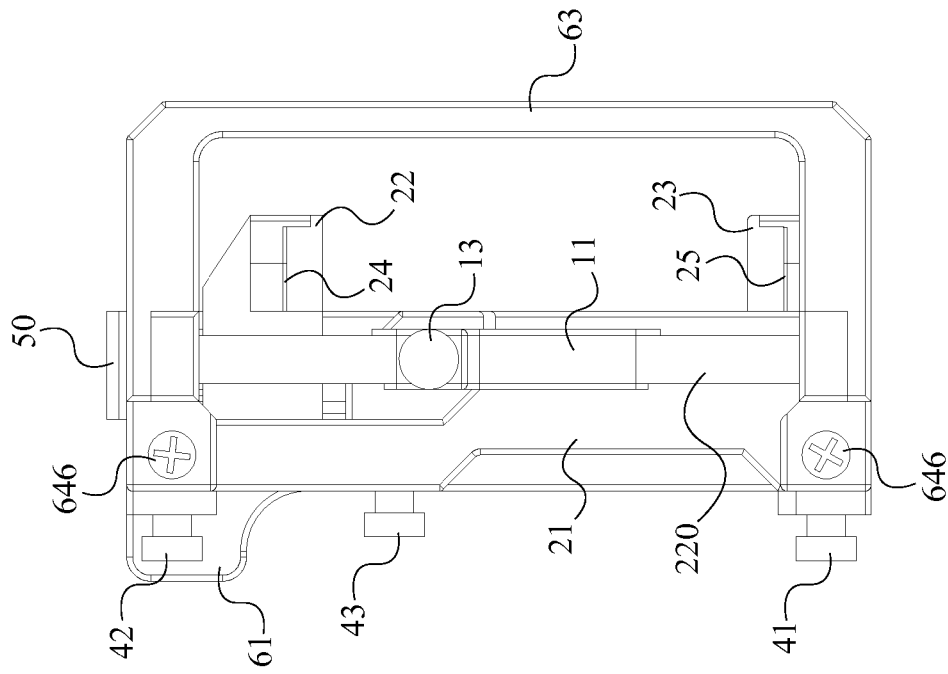
FIG. 5 is a right side elevational view of the present invention.
Figure 4:
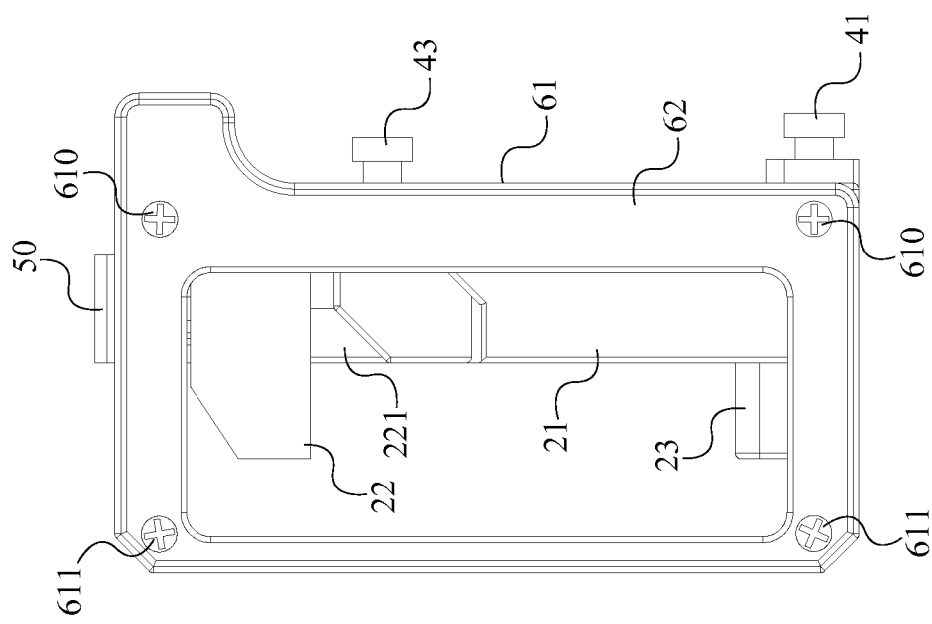
FIG. 4 is a left side elevational view of the present invention.

In reference to FIG. 5, the first clamp grip 24 is adjacently connected to the first clamp 22 and the second clamp grip 25 is adjacently connected to the second clamp 23. The first clamp grip 24 and the second clamp grip 25 are positioned along the first clamp 22 and the second clamp 23 respectively, such that the first clamp grip 24 and the second clamp grip 25 make contact with the smarthphone when the smartphone is positioned within the clamp mount assembly 20. In the preferred embodiment of the present invention, the first clamp grip 24 and the second clamp grip 25 are constructed from rubber in order to provide sufficient grip (without damaging the smartphone) to hold the smartphone in place, such that the smartphone does not inadvertently fall out of the clamp mount assembly 20. However, it is also possible for the first clamp grip 24 and the second clamp grip 25 to be constructed of other materials providing the same function.

In reference to FIG. 3, the clamp mount assembly 20 further comprises a cold shoe mount 50. The cold shoe mount 50 is adjacently connected to the first clamp 22 opposite the clamp base 21. More specifically, the cold shoe mount 50 is connected to the first clamp 22 opposite the first clamp mount standoff shaft 220 and the second clamp mount standoff shaft 221. The cold shoe mount 50 allows the user to attach a camera flash or other camera accessories to the present invention in order to be used with the smartphone while taking pictures. In reference to FIG. 6, in the preferred embodiment of the present invention, the cold shoe mount 50 is secured to the first clamp 22 by a pair of shoe mount screws 51, wherein each of the pair of shoe mount screws 51 traverses through the cold shoe mount 50 into the first clamp 22.

Figure 7:
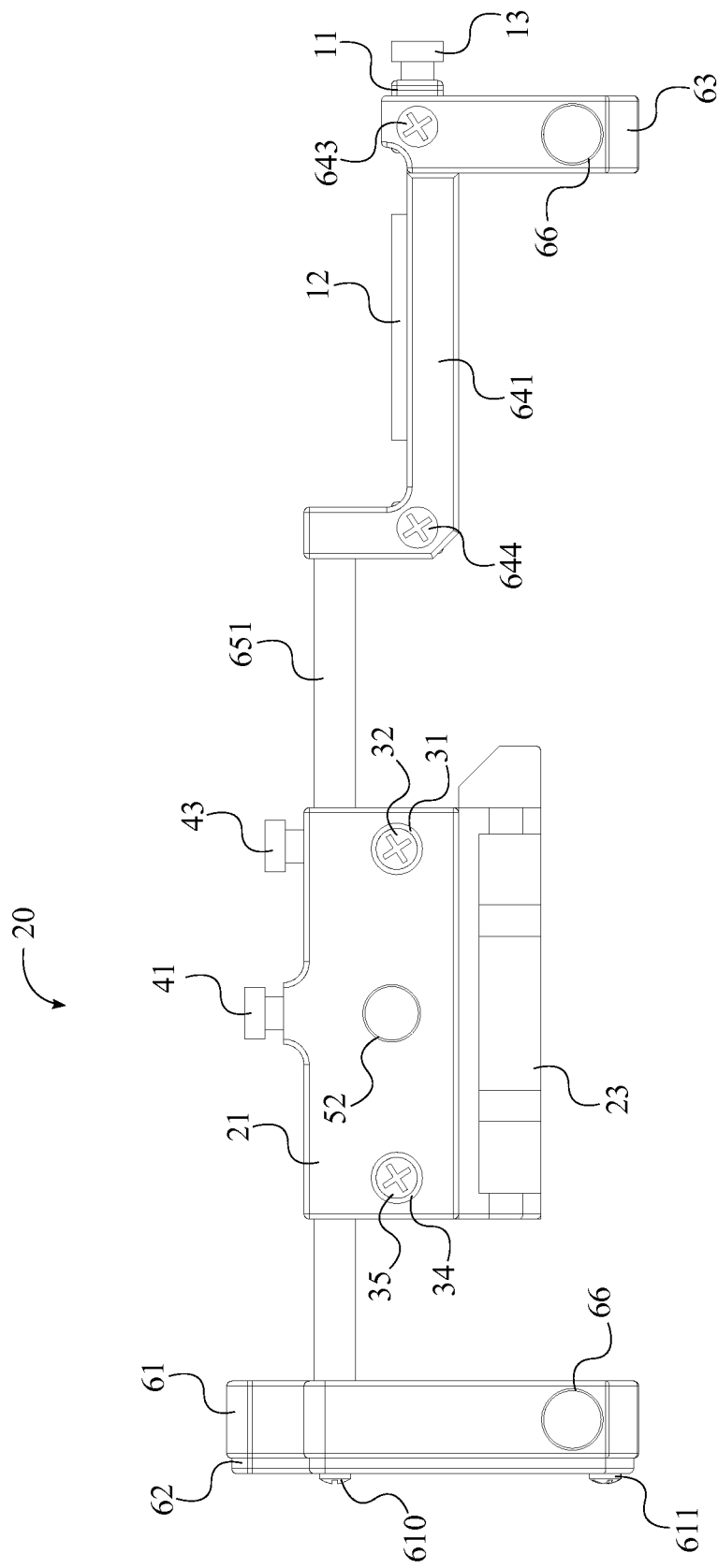
FIG. 7 is a bottom plan view of the present invention.

In reference to FIG. 7, the clamp mount assembly 20 also further comprises a threaded clamp base insert 52. The threaded clamp base insert 52 is positioned into the clamp base 21 and is positioned adjacent to the second clamp 23. The threaded clamp base insert 52 allows the present invention to be mounted to a camera tripod, or similar stand, such that the smartphone can be stabilized while taking pictures. The threaded clamp base insert 52 also allows for the attachment of other various camera accessories in addition to a tripod.

The threaded clamp base insert 52 also allows the clamp mount assembly 20 to be used without the lens mount assembly 10 or the handle assembly 60. The first handle 61 can be removed from the clamp mount support 65, wherein the clamp mount assembly 20 can be slid off of the first handle standoff shaft 650 and the second handle standoff shaft 652. The clamp mount assembly 20 can then be attached to a tripod, stabilizer, slider, etc. through the threaded clamp base insert 52, wherein the smartphone can be utilized without the addition of extra lens or accessories.

Figure 6:
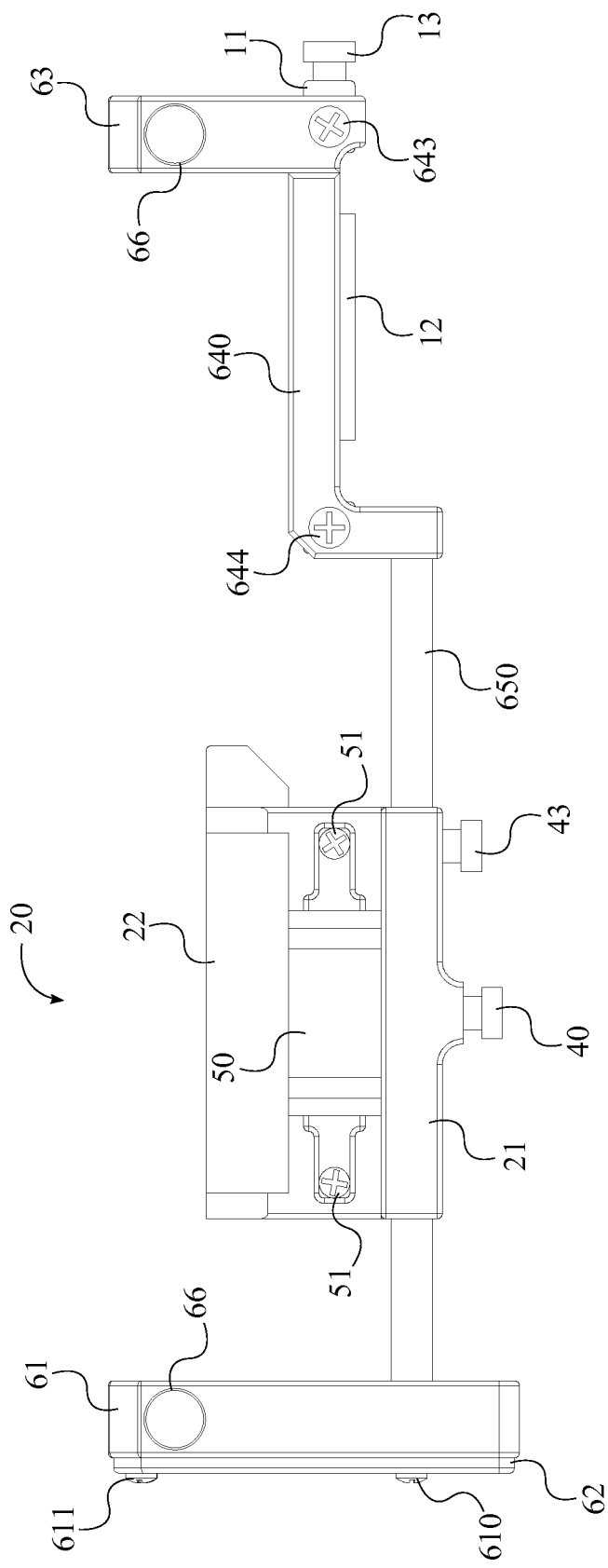
FIG. 6 is a top plan view of the present invention.

In reference to FIG. 6-7, the handle assembly 60 further comprises a plurality of threaded handle inserts. Each of the plurality of threaded handle inserts is positioned into either the first handle 61 or the second handle 63, as shown in FIG. 1. Similar to the threaded clamp mount insert 44, the plurality of threaded handle inserts allows for the attachment of various camera accessories to the present invention. In the preferred embodiment of the present invention, the plurality of threaded handle inserts comprises a first pair of handle inserts and a second pair of handle inserts. The first pair of handle inserts is positioned into the first handle 61, wherein each of the first pair of handle inserts is positioned opposite the other along the first handle 61. Similarly, the second pair of handle inserts is positioned into the second handle 63, wherein each of the second pair of handle inserts is positioned opposite the other along the second handle 63.

Figure 9:
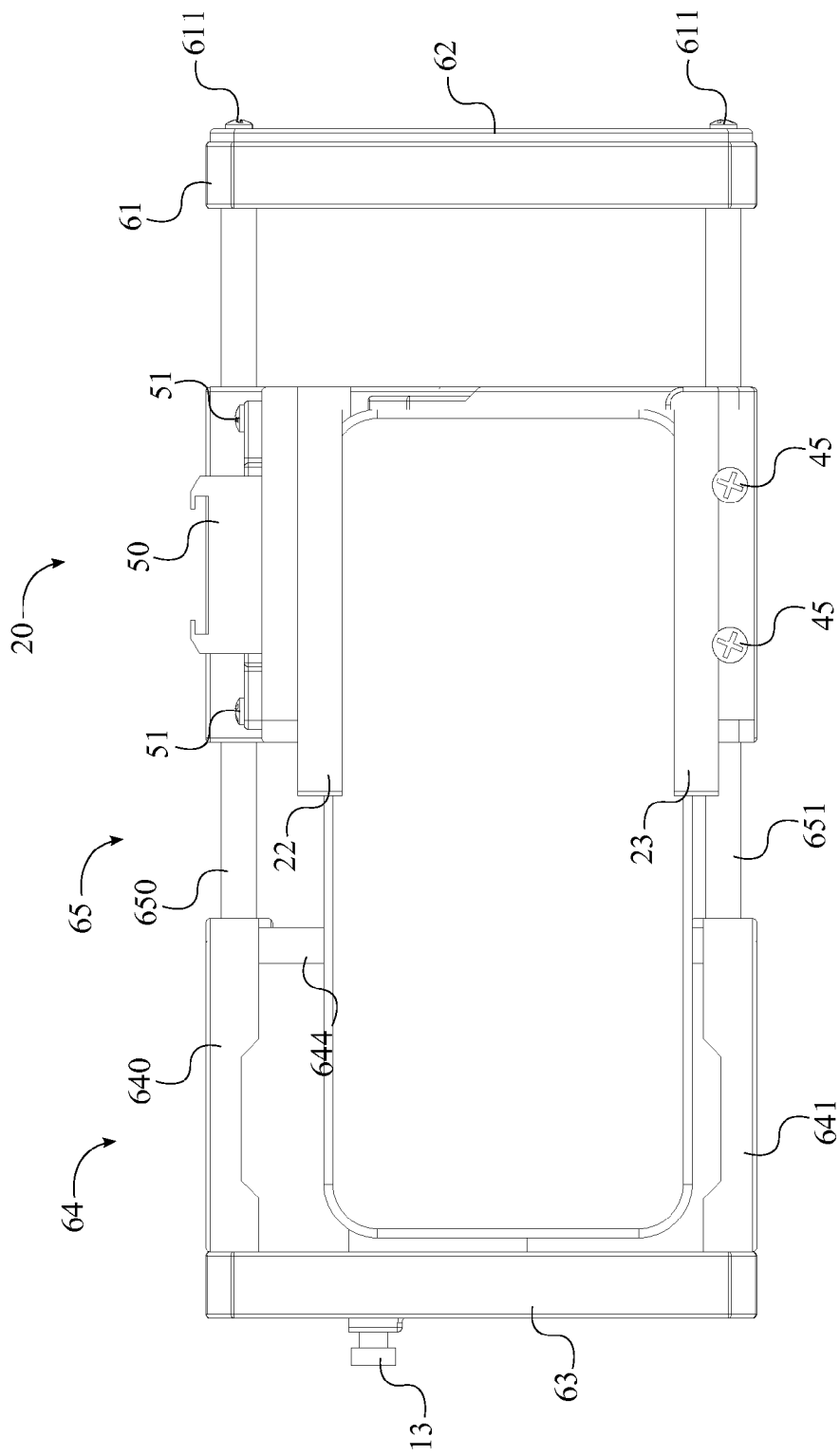
FIG. 9 is a rear elevational view of the present invention, wherein a smartphone is held in place by the clamp mount assembly as the camera lens is aligned with the lens mount assembly.

In order to use the present invention, a smartphone is first positioned in the clamp mount assembly 20 against the second clamp 23 while the first clamp 22 is pulled away from the clamp base 21, as shown in FIG. 8, wherein the first compression spring 30 and the second compression spring 33 are compressed within the clamp base 21. The first clamp 22 is then released, wherein the first compression spring 30 and the second compression spring 33 are allowed to decompress within the clamp base 21, thus pulling the first clamp 22 towards the clamp base 21 against the smartphone. In turn, the smartphone is clamped securely in between the first clamp 22 and the second clamp 23, as shown in FIG. 9. The clamp mount thumb screw 43 is then threaded through the clamp base 21 until the clamp mount thumb screw 43 engages either the first clamp mount standoff shaft 220 or the second clamp mount standoff shaft 221 in order to ensure that the first clamp 22 is locked in place and cannot be inadvertently pulled open.

Once the smartphone is positioned in between the first clamp 22 and the second clamp 23, the clamp base 21 is slid along the first handle standoff shaft 650 and the second handle standoff shaft 651 in order to horizontally align the camera lens with the aperture 111 of the lens mount base 11. When the camera lens has been aligned with the aperture 111, the first thumb screw 40 and the second thumb screw 41 are threaded through the clamp base 21 until the first thumb screw 40 engages the first handle standoff shaft 650 and the second thumb screw 41 engages the second handle standoff shaft 651. In turn, the clamp base 21 is locked in position along the first handle standoff shaft 650 and the second handle standoff shaft 651.

With the camera lens horizontally aligned with the aperture 111, the lens mount base 11 is then slid along the first lens mount standoff shaft 642 and the second lens mount standoff shaft 644 in order to vertically align the aperture 111 with the camera lens. Once the aperture 111 has been vertically aligned with the camera lens, the lens mount thumb screw 13 is threaded through the lens mount base 11 until the lens mount thumb screw 13 engages either the first lens mount standoff shaft 642 or the second lens mount standoff shaft 644. In turn, the lens mount base 11 is locked in position along the first lens mount standoff shaft 642 and the second lens mount standoff shaft 644. A lens or accessory, such as a macro lens, fish eye lens, or wide angle lens can then be attached to the lens mount ring 12, as shown in FIG. 10. Other camera accessories, such as a flash, tripod, stabilizers, or microphones, can then be attached to the present invention via the cold shoe mount 50, the threaded clamp base insert 52, or the plurality of threaded handle inserts.

In order to provide a more compact design, it is also possible for the present invention to be used without the first handle 61 and the second handle 63. Along with the removal of the first handle 61, the length of the first handle standoff shaft 650 and the second handle standoff shaft 651 may also be shortened. It may also be desirable to provide a stopper or pair of stoppers to attach to the first handle standoff shaft 650 and the second handle standoff shaft 651 to prevent the clamp mount assembly 20 from inadvertently sliding off. The compact design allows for the enhanced portability, maneuverability, and storage of the present invention.

While the present invention has been described in association with a smartphone, it is also possible for the present invention to be designed for use with a tablet. In order to accommodate a tablet as opposed to a smartphone, the components of the present invention remain the same but the specific size of some components may be enlarged or extended. Namely, the first handle standoff shaft 650, the second handle standoff shaft 651, the first clamp mount standoff shaft 220, and the second clamp mount standoff shaft 221 can be extended in order to accommodate the increased size of the tablet. It is also possible to extend the first lens mount standoff shaft 642, the second lens mount standoff shaft 644, the first handle 61, the second handle 63, and the clamp base 21 in order to form a larger frame for supporting a tablet.

Although the invention has been explained in relation to its preferred embodiment, it is to be understood that many other possible modifications and variations can be made without departing from the spirit and scope of the invention as hereinafter claimed.

What is claimed is:

1. A universal adjustable lens adapter comprising:
a lens mount assembly;
a clamp mount assembly; and
a handle assembly, wherein:
the lens mount assembly comprises a lens mount base and a lens mount ring;
the handle assembly comprises a clamp mount support, a lens mount support, a first handle, and a second handle;
the clamp mount support is adjacently connected to the lens mount support;
the first handle is adjacently attached to the clamp mount support opposite the lens mount support;

the second handle is adjacently attached to the lens mount support opposite the clamp mount support;

the lens mount base is slidably connected to the lens mount support along a first slide axis;

the lens mount ring is adjacently connected to the lens mount base;

the clamp mount assembly is slidably attached to the clamp mount support along a second slide axis; and the first slide axis and the second slide axis are aligned perpendicular to each other.

2. The universal adjustable lens adapter as claimed in claim 1, wherein:

the clamp mount support comprises a first handle standoff shaft and a second handle standoff shaft; and the clamp mount assembly is slidably attached to the first handle standoff shaft and the second handle standoff shaft.

3. The universal adjustable lens adapter as claimed in claim 2, wherein:

the clamp mount assembly comprises a clamp base; and the clamp base being is slidably attached to the first handle standoff shaft and the second handle standoff shaft.

4. The universal adjustable lens adapter as claimed in claim 3, wherein:

the clamp mount assembly further comprises a first thumb screw and a second thumb screw;

the first thumb screw and the second thumb screw are positioned into the clamp base;

the first thumb screw is positioned adjacent to the first handle standoff shaft; and the second thumb screw is positioned adjacent to the second handle standoff shaft.

5. The universal adjustable lens adapter as claimed in claim 2, wherein:

the first handle standoff shaft and the second handle standoff shaft are adjacently attached to the first handle; and the first handle standoff shaft and the second handle standoff shaft are positioned opposite each other along the first handle.

6. The universal adjustable lens adapter as claimed in claim 5, wherein:

the handle assembly further comprises a handle skin, the handle skin being adjacently attached to the first handle opposite the first handle standoff shaft and the second handle standoff shaft.

7. The universal adjustable lens adapter as claimed in claim 1, wherein:

the lens mount support comprises a first lens mount standoff shaft and a second lens mount standoff shaft, the first lens mount standoff shaft being positioned adjacent to the second handle, and the lens mount base being slidably connected to the first lens mount standoff shaft and the second lens mount standoff shaft.

8. The universal adjustable lens adapter as claimed in claim 7, wherein:

the lens mount assembly further comprises a lens mount thumb screw, the lens mount thumb screw being positioned into the lens mount base, and the lens mount thumb screw being positioned adjacent to the first lens mount standoff shaft or the second lens mount standoff shaft.

9. The universal adjustable lens adapter as claimed in claim 7, wherein:

the lens mount support further comprises a first arm and a second arm, the first lens mount standoff shaft and the second lens mount standoff shaft being adjacently connected to the first arm and the second arm, and the first lens mount standoff shaft and the second lens mount standoff shaft being positioned in between the first arm and the second arm.

10. The universal adjustable lens adapter as claimed in claim 1, wherein:

the lens mount support comprises a first arm and a second arm the first arm and the second arm being adjacently attached to the second handle, and the first arm and the second arm being positioned opposite each other along the second handle.

11. The universal adjustable lens adapter as claimed in claim 1, wherein:

the lens mount support comprises a first arm and a second arm; and the clamp mount support comprises a first handle standoff shaft and a second handle standoff shaft, the first handle standoff shaft being adjacently connected to the first arm, and the second handle standoff shaft being adjacently connected to the second arm.

12. The universal adjustable lens adapter as claimed in claim 1, wherein:

the clamp mount assembly comprises a clamp base, a first clamp, and a second clamp, the first clamp being slidably connected to the clamp base;

the second clamp being adjacently attached to the clamp base; and the first clamp and the second clamp being positioned opposite each other along the clamp base.

13. The universal adjustable lens adapter as claimed in claim 12, wherein:

the first clamp comprises a first clamp mount standoff shaft and a second clamp mount standoff shaft, the first clamp mount standoff shaft and the second clamp mount standoff shaft being positioned opposite each other along the first clamp, and the first clamp mount standoff shaft and the second clamp mount standoff shaft being slidably connected to the clamp base.

14. The universal adjustable lens adapter as claimed in claim 13, wherein:

the clamp mount assembly further comprises a first compression spring and a second compression spring, the first compression spring and the second compression spring being positioned within the clamp base, the first compression spring being mechanically coupled to the first clamp mount standoff shaft, and the second compression spring being mechanically coupled to the second clamp mount standoff shaft.

15. The universal adjustable lens adapter as claimed in claim 13, wherein:

the clamp mount assembly further comprises a clamp mount thumb screw, the clamp mount thumb screw being positioned into the clamp base, and the clamp mount thumb screw being positioned adjacent to the first clamp mount standoff shaft or the second clamp mount standoff shaft.

16. The universal adjustable lens adapter as claimed in claim 12, wherein:

the clamp mount assembly further comprises a cold shoe mount, the cold shoe mount being adjacently connected to the first clamp opposite the clamp base.

17. The universal adjustable lens adapter as claimed in claim 12, wherein:
the clamp mount assembly further comprises a first clamp pad and a second clamp pad,
the first clamp pad being adjacently connected to the first clamp, and
the second clamp pad being adjacently connected to the second clamp.

18. The universal adjustable lens adapter as claimed in claim 12, wherein:
the clamp base comprises a threaded clamp mount insert,
the threaded clamp mount insert being positioned into the clamp base, and
the threaded clamp mount insert being positioned adjacent to the second clamp.

19. The universal adjustable lens adapter as claimed in claim 1, wherein:
the handle assembly further comprises a plurality of threaded handle inserts,
each of the plurality of threaded handle inserts being positioned into either the first handle or the second handle.

20. A universal adjustable lens adapter comprising:
a lens mount assembly;
a clamp mount assembly; and
a handle assembly, wherein:
the lens mount assembly comprises a lens mount base and a lens mount ring;
the clamp mount assembly comprises a clamp base, a first clamp, and a second clamp;
the handle assembly comprises a clamp mount support, a lens mount support, a first handle, and a second handle;
the clamp mount support comprises a first handle standoff shaft and a second handle standoff shaft;
the lens mount support comprises a first lens mount standoff shaft, a second lens mount standoff shaft, a first arm, and a second arm;
the first clamp comprises a first clamp mount standoff shaft and a second clamp mount standoff shaft;
the first handle standoff shaft and the second handle standoff shaft being are adjacently attached to the first handle;
the first handle standoff shaft and the second handle standoff shaft being are positioned opposite each other along the first handle;
the first arm being is adjacently connected to the first handle standoff shaft opposite the first handle;
the second arm being is adjacently connected to the second handle standoff shaft opposite the first handle;
the second handle being is adjacently attached to the first arm opposite the first handle standoff shaft;
the second handle being is adjacently attached to the second arm opposite the second handle standoff shaft;
the first arm and the second arm are positioned opposite each other along the second handle;
the first lens mount standoff shaft and the second lens mount standoff shaft are adjacently connected to the first arm and the second arm;
the first lens mount standoff shaft and the second lens mount standoff shaft are positioned in between the first arm and the second arm;
the first lens mount standoff shaft is positioned adjacent to the second handle;
the lens mount base is slidably connected to the first lens mount standoff shaft and the second lens mount standoff shaft along a first slide axis;
the lens mount ring is adjacently connected to the lens mount base;
the clamp base is slidably attached to the first handle standoff shaft and the second handle standoff shaft along a second slide axis;
the first slide axis and the second slide axis are aligned perpendicular to each other;
the first clamp mount standoff shaft and the second clamp mount standoff shaft are positioned opposite each other along the first clamp;
the first clamp mount standoff shaft and the second clamp mount standoff shaft being are slidably connected to the clamp base;
the second clamp is adjacently attached to the clamp base; and
the first clamp and the second clamp are positioned opposite each other along the clamp base.

* * * * *